United States Patent
Normington et al.

(10) Patent No.: US 8,375,377 B2
(45) Date of Patent: Feb. 12, 2013

(54) CONTROLLING JAVA VIRTUAL MACHINE COMPONENT BEHAVIOR ON A PER-CLASSLOADER BASIS

(75) Inventors: Glyn Normington, Hampshire (GB);
Ian Oliver Partridge, Hampshire (GB);
Brian David Peacock, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 12/399,184

(22) Filed: Mar. 6, 2009

(65) Prior Publication Data

US 2010/0229165 A1    Sep. 9, 2010

(51) Int. Cl.
*G06F 9/44* (2006.01)
(52) U.S. Cl. .................... 717/166; 717/118; 717/151
(58) Field of Classification Search .............. 717/166
See application file for complete search history.

(56) References Cited

U.S. PATENT DOCUMENTS

| | | | |
|---|---|---|---|
| 7,069,550 B2* | 6/2006 | Fraenkel et al. ........... | 717/166 |
| 7,150,012 B2 | 12/2006 | Hill | |
| 7,644,403 B2* | 1/2010 | Atsatt ....................... | 717/166 |
| 7,743,282 B2* | 6/2010 | Colyer ...................... | 714/38.1 |
| 7,747,877 B2* | 6/2010 | Jin et al. ................... | 713/194 |
| 7,870,546 B2* | 1/2011 | Meduri et al. ............ | 717/166 |
| 7,890,945 B2* | 2/2011 | Jurkiewicz et al. ....... | 717/166 |
| 7,954,096 B2* | 5/2011 | Atsatt ....................... | 717/166 |
| 8,020,156 B2* | 9/2011 | Atsatt et al. .............. | 717/166 |
| 2003/0225917 A1 | 12/2003 | Partamian et al. | |
| 2005/0028152 A1* | 2/2005 | Hays et al. ................ | 717/118 |
| 2005/0100113 A1* | 5/2005 | Corts et al. ............... | 375/295 |
| 2007/0033273 A1* | 2/2007 | White et al. .............. | 709/223 |
| 2007/0038986 A1* | 2/2007 | Houser ..................... | 717/151 |
| 2007/0061792 A1* | 3/2007 | Atsatt ....................... | 717/151 |
| 2007/0061796 A1* | 3/2007 | Atsatt ....................... | 717/166 |
| 2008/0127157 A1* | 5/2008 | Burns et al. .............. | 717/166 |
| 2008/0229324 A1* | 9/2008 | Huang et al. ............. | 719/311 |
| 2008/0301636 A1* | 12/2008 | Khan ........................ | 717/118 |
| 2009/0083708 A1* | 3/2009 | Knibb et al. .............. | 717/117 |
| 2009/0138731 A1* | 5/2009 | Jin et al. ................... | 713/194 |
| 2010/0070960 A1* | 3/2010 | Atsatt ....................... | 717/166 |

OTHER PUBLICATIONS

Heejune Ahn, Towards Reliable OSGi Framework and Applications, ACM, 2006, 6 pages, <URL:http://delivery.acm.org/10.1145/1150000/1141617/p1456-ahn.pdf>.*

Simon Richard Kaegi, Modular Java Web Applications, ACM, 2008, 6 pages, <URL:http://delivery.acm.org/10.1145/1370000/1363851/p688-kaegi.pdf>.*

Vladimir Nikolov, Recoverable Class Loaders for a Fast Restart of Java Application, ACM, 2009, 12 pages, <URL:http://delivery.acm.org/10.1145/1510000/1503501/p53-nikolov.pdf>.*

(Continued)

*Primary Examiner* — Thuy Dao
*Assistant Examiner* — Hua Lu
(74) *Attorney, Agent, or Firm* — Schmeiser, Olsen & Watts; Alvin Borromeo

(57) ABSTRACT

A method and system for controlling an operation of a Java Virtual Machine (JVM) component on a per-classloader basis. A manifest of a bundle in an Open Services Gateway Initiative (OSGi®) compliant framework is parsed and metadata in the manifest is identified. The metadata is stored in a Java® classloader uniquely associated with the bundle. An upcoming performance of an operation which can be affected by a value of the stored metadata is identified by the JVM component. A value of the stored metadata is read from the classloader. The operation of the JVM component is controlled based on the value of the stored metadata.

17 Claims, 4 Drawing Sheets

OTHER PUBLICATIONS

Anne Anderson, Java Access Control Mechanisms, ACM, 2002, 24 pages, <URL:http://delivery.acm.org/10.1145/1700000/1698154/smli_tr-2002-108.pdf>.*

Richard Hall, A Policy-Driven Class Loader to Support Deployment in Extensible Frameworks, Google Scholar, 2004, 16 pages, <URL: http://www.springerlink.com/content/6bwy0ct0wh3ve873/fulltext.pdf>.*

Clement Escoffier, Developing an OSGi-like Service Platform for .NET, Google Scholar, 2006, 5 pages, <URL: http://membres-liglab.imag.fr/donsez/pub/publi/ccnc06-escoffier.pdf>.*

* cited by examiner

CONTROLLING JAVA VIRTUAL MACHINE COMPONENT BEHAVIOR ON A PER-CLASSLOADER BASIS

FIELD OF THE INVENTION

The present invention relates to a data processing method and system for managing a Java® Virtual Machine component, and more particularly to a technique for controlling an operation of a Java® Virtual Machine component on a per-classloader basis.

BACKGROUND OF THE INVENTION

Conventionally, combinations of command-line options are used to configure Java® applications. As these command-line options are not sufficiently understood by all application programmers, specifying needed command-line options is error-prone. Furthermore, the command-line options used to configure Java® applications are specific to one vendor's Java® Virtual Machine (JVM), which results in misconfiguration or application failure if an option understood by one vendor's JVM is accidentally passed to another, incompatible JVM. Moreover, the command-line options are inflexible as they can be applied only globally to JVM behavior. Thus, there exists a need to overcome at least one of the preceding deficiencies and limitations of the related art.

SUMMARY OF THE INVENTION

The present invention provides a computer-implemented method of controlling an operation of a component (JVM component) of a Java Virtual Machine (JVM) on a per-classloader basis. The method comprises:

a computer system parsing a manifest of a bundle in a computing framework;

responsive to parsing the manifest, the computer system identifying metadata in the manifest, wherein the computing framework has knowledge that the metadata controls the operation of the JVM component, and wherein the computer system includes the JVM component;

subsequent to identifying metadata, the computer system storing the metadata in a Java classloader uniquely associated with the bundle;

subsequent to storing the metadata, the computer system identifying an upcoming performance of the operation of the JVM component;

responsive to identifying the upcoming performance of the operation of the JVM component, the computer system reading a value of the stored metadata from the Java classloader; and controlling, by a processor of the computer system, the operation of the JVM component based on the value of the stored metadata.

Systems and computer program products corresponding to the above-summarized methods are also described herein.

Embodiments of the present invention provide a method and system for controlling an operation of a Java® Virtual Machine component (i.e., altering the behavior of the JVM) on a per-classloader basis using metadata so that an application programmer who programmed an application may include the metadata in Open Services Gateway Initiative (OSGi®) compliant bundles of the application, without requiring a user to specify correct command-line options. Further, the present invention allows the JVM that does not understand the metadata provided in the bundle's manifest to silently ignore the metadata, thereby avoiding a problem of the application failing to start. Still further, the per-classloader control of the JVM provided by the present invention may facilitate the reusability of OSGi® compliant bundles.

DETAILED DESCRIPTION OF THE INVENTION

OVERVIEW

One or more embodiments of the present invention provide a technique for using arbitrary metadata within manifests of bundles of an application to control the behavior of a JVM component, where the application is an OSGi® compliant application. As the JVM loads the bundle and creates a corresponding classloader, the JVM parses the metadata provided in the bundle and tags the internal JVM classloader structure if appropriate. As the application is executing, the behavior of the JVM is altered according to the metadata. For example, the metadata may provide hints to a garbage collector about the workload of the application, or to the just-in-time (JIT) compiler to influence compilation. As used herein, "OSGi® compliant" is defined as being compliant with the OSGi® (formerly Open Services Gateway Initiative) computing framework.

System for Controlling a JVM Operation

Figure 1:
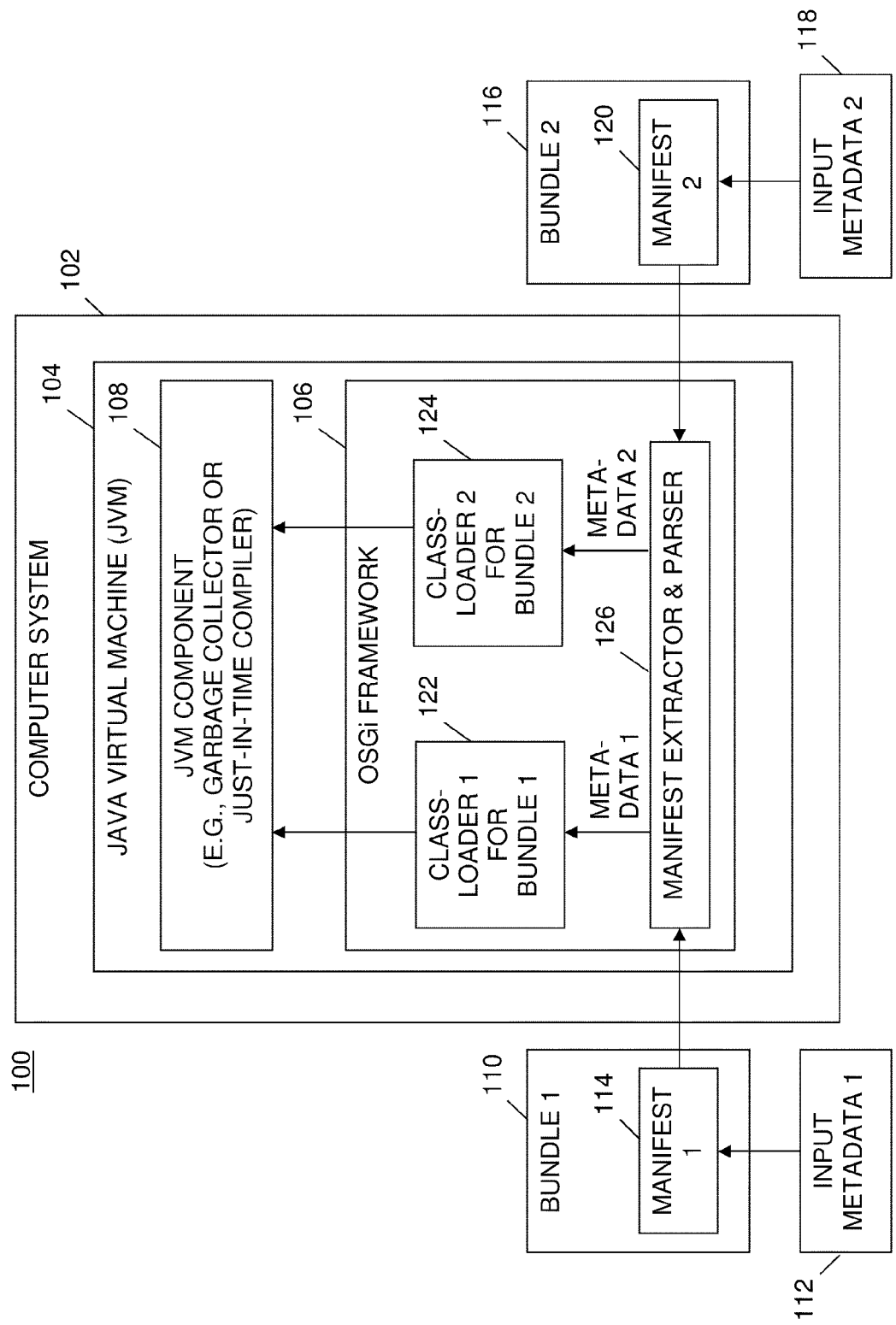
FIG. 1 is a block diagram of a system for controlling an operation of a Java® Virtual Machine component on a per-classloader basis, in accordance with embodiments of the present invention.

FIG. 1 is a block diagram of a system for controlling an operation of a Java® Virtual Machine component on a per-classloader basis, in accordance with embodiments of the present invention. System 100 includes a computer system 102 that includes a JVM 104. JVM 104 includes an OSGi® framework 106 and one or more JVM components such as JVM component 108. JVM component 108 may be, for example, a garbage collector or a JIT compiler. OSGi® framework 106 may be any OSGi® compliant computing framework.

External to JVM 104 are multiple OSGi® compliant bundles that include a bundle 110 (a.k.a. bundle 1) and a bundle 116 (a.k.a. bundle 2). Input metadata 112 is received by a manifest 114 (a.k.a. manifest file 114 or manifest 1) included in bundle 110. Input metadata 118 is received by a manifest 120 (a.k.a. manifest file 120 or manifest 2) included in bundle 116.

OSGi® framework 106 includes classloaders associated with the aforementioned multiple OSGi® compliant bundles in a one-to-one correspondence. The classloaders included in OSGi® framework 106 include classloader 122 (a.k.a. classloader 1 for bundle 1) and classloader 124 (a.k.a. classloader 2 for bundle 2).

A manifest extractor & parser 126 extracts manifest 114 from bundle 110 and manifest 120 from bundle 116. Manifest extractor & parser 126 also parses the extracted manifest 114 to obtain one or more headers (not shown) that include a first set of metadata definitions (a.k.a. metadata 1) and parses the extracted manifest 120 to obtain one or more headers (not shown) that include a second set of metadata definitions (a.k.a. metadata 2). Metadata 1 is stored in classloader 122 and metadata 2 is stored in classloader 124.

The functionality of the components of system 100 and how the storage of metadata in classloaders allows control of a JVM component is described in more detail below relative to FIG. 2 and FIG. 3.

The JVM labeled 104 in FIG. 1 is a registered trademark of Sun Microsystems, Inc. located in Santa Clara, Calif.

Bundle Parsing

Figure 2:
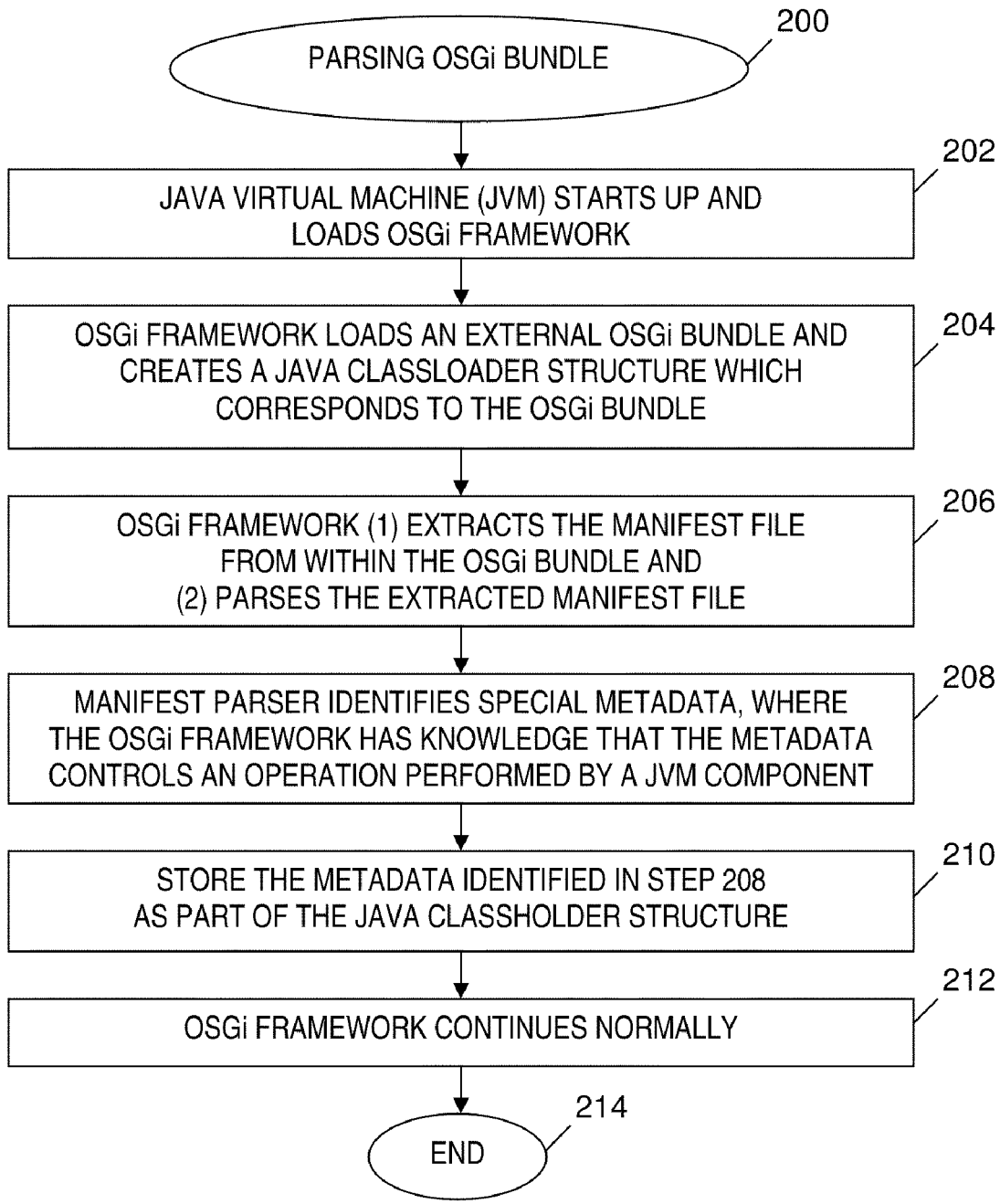
FIG. 2 is a flowchart of a process for parsing an OSGi® bundle in the system of FIG. 1, in accordance with embodiments of the present invention.

FIG. 2 is a flowchart of a process for parsing an OSGi® bundle in the system of FIG. 1, in accordance with embodiments of the present invention. The process of parsing an OSGi® bundle (e.g., bundle 110 in FIG. 1) starts at step 200. In step 202, JVM 104 (see FIG. 1) starts up and loads OSGi® framework 106 (see FIG. 1).

In step 204, OSGi® framework 106 (see FIG. 1) loads an external OSGi® bundle (e.g., bundle 110 in FIG. 1) and creates a Java® classloader structure (e.g., classloader 122 in FIG. 1) that corresponds to the loaded OSGi® bundle. In step 206, manifest extractor & parser 126 (see FIG. 1) (1) extracts the manifest file (e.g., manifest 114 in FIG. 1) from within the OSGi® bundle (e.g., bundle 110 in FIGS. 1) and (2) parses the extracted manifest file to obtain one or more headers (a.k.a. manifest headers) that include metadata. For example, the OSGi®framework, 106 (see FIG. 1) uses the Bundle.getHeaders( ) application programming interface (API) to parse the extracted manifest file (e.g., manifest 114 in FIG. 1) to obtain one or more headers of the manifest file.

In step 208, manifest extractor & parser 126 (see FIG. 1) identifies special metadata included in the manifest header(s) obtained in step 206. The OSGi® framework 106 (see FIG. 1) has knowledge that the identified special metadata controls an operation performed by JVM component 108 (see FIG. 1).

In step 210, OSGi® framework 106 (see FIG. 1) stores the special metadata identified in step 208 as part of a Java® classloader structure (e.g., classloader 122 in FIG. 1). Storing the special metadata in step 208 allows the metadata to be available to the JVM 104 (see FIG. 1).

In step 212, OSGi® framework 106 (see FIG. 1) continues operating normally. The process of FIG. 2 ends at step 214.

In one embodiment, all manifest headers in bundles are stored as properties in each bundle's classloader. In another embodiment, only manifest headers that are not recognized as OSGi®-defined headers are stored in each bundle's classloader. In still another embodiment, a JVM component (e.g., JVM component 108 in FIG. 1) that needs to know the value of a piece of metadata associated with a particular classloader (e.g., classloader 122 in FIG. 1) keeps track of bundles associated with classloaders. The JVM component uses the getHeaders API to extract the headers from the manifest file (e.g., manifest 114 in FIG. 1) in the bundle associated with the classloader that is associated with the aforementioned piece of metadata.

Given the embodiments described above, arbitrary kinds of metadata may be stored as manifest headers, associated with each bundle's classloader, and acted upon by the JVM 104 (see FIG. 1). The present invention may include a naming scheme for manifest headers that prevents distinct JVMs from using the same manifest header. For example, a reverse domain name convention can be used in which the JVM of entity XYZ uses manifest headers starting with "com-xyz-".

Process for Controlling a JVM Operation

Figure 3:
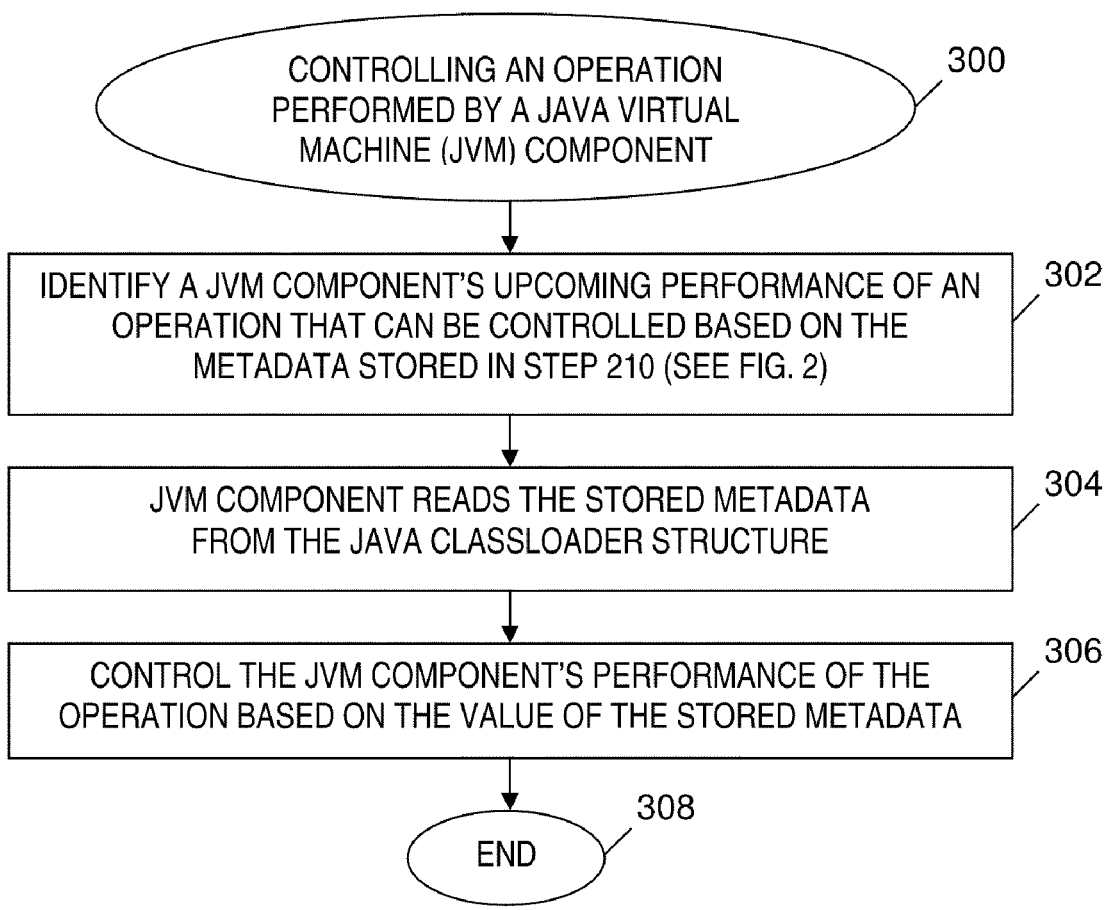
FIG. 3 is a flowchart of a process for controlling the operation of a Java® Virtual Machine component using the results of the process of FIG. 2, where the process for controlling the operation is implemented in the system of FIG. 1, in accordance with embodiments of the present invention.

FIG. 3 is a flowchart of a process for controlling the operation of a Java® Virtual Machine component using the results of the process of FIG. 2, where the process for controlling the operation is implemented in the system of FIG. 1, in accordance with embodiments of the present invention. The process of controlling an operation performed by JVM component 108 (see FIG. 1) begins at step 300. In step 302, JVM 104 (see FIG. 1) identifies an upcoming performance of an operation of JVM component 108 (see FIG. 1), where the operation can be controlled based on the metadata stored in step 210 (see FIG. 2) (a.k.a. "the stored metadata").

In step 304, JVM component 108 (see FIG. 1) reads the stored metadata from the Java® classloader structure (e.g., classloader 122 in FIG. 1) in which the stored metadata was stored in step 210 (see FIG. 2).

In one embodiment, step 304 includes (1) the JVM component 108 (see FIG. 1) querying the aforementioned Java® classloader structure; and (2) responsive to querying the Java® classloader structure, the JVM component 108 (see FIG. 1) receiving a value of a property in the Java® classloader structure, where the value of the property is the value of the stored metadata.

In step 306, computer system 102 (see FIG. 1) controls a performance of the operation by JVM component 108 (see FIG. 1). Step 306 controls the aforementioned performance of the operation based on the value of the stored metadata.

In one embodiment, step 306 includes (1) the JVM component 108 (see FIG. 1) determining a state of an object associated with the OSGi® compliant bundle loaded in step 204 (see FIG. 2) satisfies a predefined criterion that is based on a value of a property included in Java® classloader structure from which the stored metadata was read in step 304; and (2) responsive to determining that the state of the aforementioned object satisfies the predefined criterion, the JVM component 108 (see FIG. 1) performing the operation, where a result of performing the operation is managing the object.

EXAMPLE

This section presents merely one example of how the present invention may be used. In this example, JVM component 108 (see FIG. 1) is a garbage collector and the special metadata is a "com-ibm-jvm-gc-softreferencethreshold: 2" value. This value is stored in the Java® classloader structure 122 (see FIG. 1). The operation in step 302 (see FIG. 3) is garbage collection.

When it is time to perform a garbage collection (see step 302 in FIG. 3), the garbage collector has to decide whether to collect soft reference objects. Conventionally, this decision would be a global decision in which the garbage collection collects either all soft reference objects that have reached a certain age or no soft reference objects. The present invention allows the JVM and its components to be more discriminating, thereby allowing the garbage collector to make the decision to collect soft reference objects on a per-classloader basis. In response to encountering a soft reference object, the garbage collector queries the soft reference object's classloader structure to determine the value of the com-ibm-jvm-gc-softreferencethreshold property. The value of the com-ibm-jvm-gc-softreferencethreshold property is an example of the stored metadata in step 304 in FIG. 3. If the soft reference object has survived a number of garbage collections greater than or equal to the determined value of the property, then the garbage collector collects the soft reference object (see step 306 of FIG. 3).

Computer System

Figure 4:
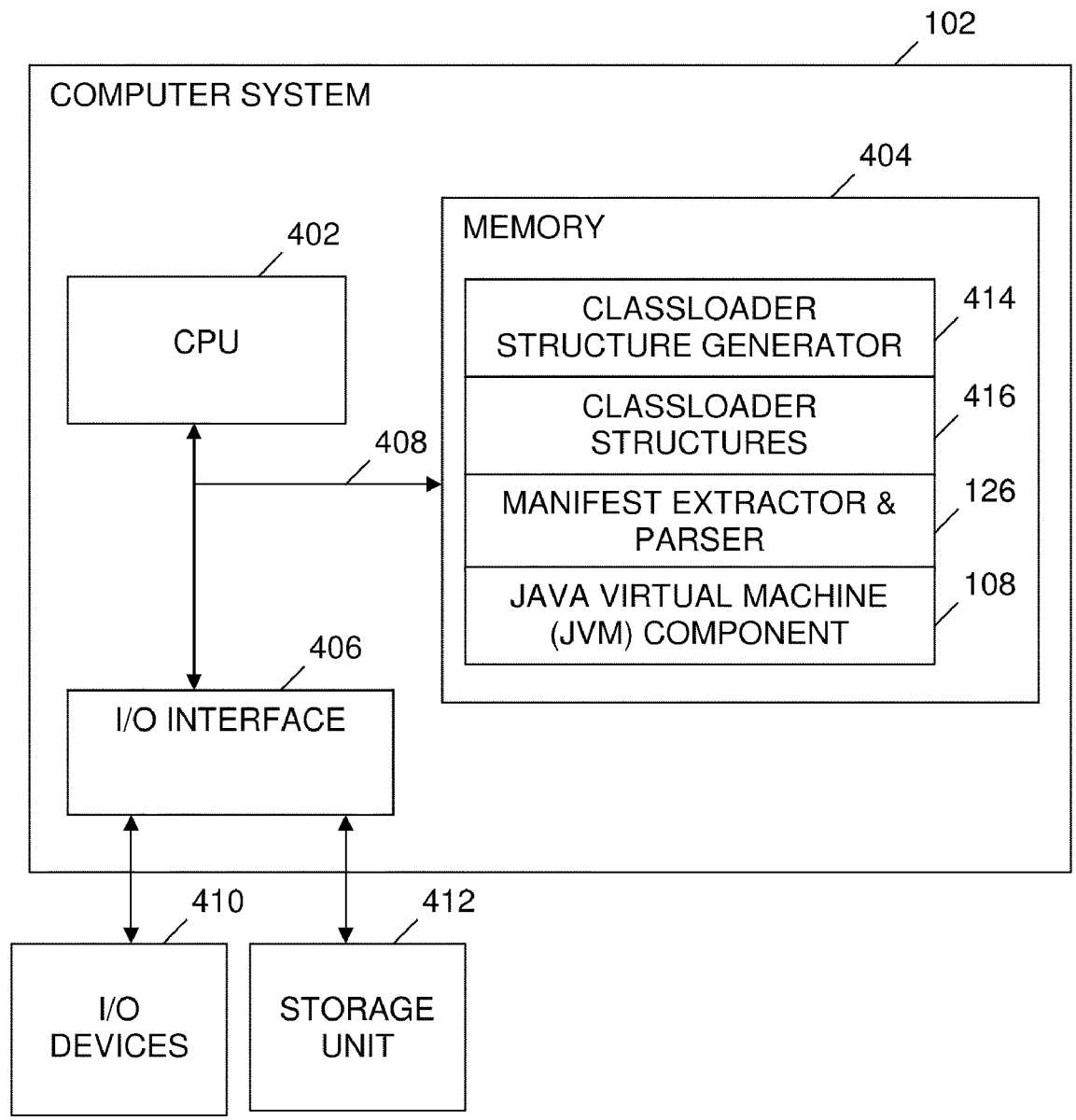
FIG. 4 is a block diagram of a computer system that is included in the system of FIG. 1 and that implements the processes of FIG. 2 and FIG. 3, in accordance with embodiments of the present invention.

FIG. 4 is a block diagram of a computer system that is included in the system of FIG. 1 and that implements the processes of FIG. 2 and FIG. 3, in accordance with embodiments of the present invention. Computer system 102 generally comprises a central processing unit (CPU) 402, a memory 404, an input/output (I/O) interface 406, and a bus 408. Further, computer system 102 is coupled to I/O devices 410 and a computer data storage unit 412. CPU 402 performs computation and control functions of computer system 102. CPU 402 may comprise a single processing unit, or be distributed across one or more processing units in one or more locations (e.g., on a client and server).

Memory 404 may comprise any known type of computer data storage and/or transmission media, including bulk storage, magnetic media, optical media, random access memory (RAM), read-only memory (ROM), a data cache, a data object, etc. In one embodiment, cache memory elements of memory 404 provide temporary storage of at least some program code (e.g., code for manifest extractor & parser 126 or code for JVM component 108) in order to reduce the number of times code must be retrieved from bulk storage during execution. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store and retrieve information (e.g., data or program instructions such as code of classloader structure generator 414, manifest extractor & parser 126 and JVM component 108) from an auxiliary storage device such as computer data storage unit 412 or another computer data storage unit (not shown). Computer data storage unit 412 may be a non-volatile storage device, such as a magnetic disk drive (i.e., hard disk drive) or an optical disc drive (e.g., a CD-ROM drive which receives a CD-ROM disk).

Memory 404 includes computer program code for classloader structure generator 414, manifest extractor & parser 126 and JVM component 108 that provide the logic for processes for parsing an OSGi® bundle and controlling an operation of a JVM component on a per-classloader basis (e.g., the processes of FIG. 2 and FIG. 3). Memory 404 also includes classloader structures 416, which include classloader 122 (see FIG. 1) and classloader 124 (see FIG. 1). Further, memory 404 may include other systems not shown in FIG. 4, such as an operating system (e.g., Linux) that runs on CPU 402 and provides control of various components within and/or connected to computer system 102.

Memory 404, storage unit 412, and/or one or more other computer data storage units (not shown) that are operatively coupled to computer system 102 may store the metadata identified in the process of FIG. 2. The processes of FIG. 2 and FIG. 3 result in a transformation that: (1) transforms a computer data storage unit that stores a classloader structure (e.g., classloader 122 in FIG. 1) from a storage unit that does not include the metadata identified in the process of FIG. 2 to a storage unit that includes the aforementioned metadata.

As will be appreciated by one skilled in the art, the present invention may be embodied as a system, method or computer program product. Accordingly, an embodiment of the present invention may be an entirely hardware embodiment, an entirely software embodiment (including firmware, resident software, micro-code, etc.) or an embodiment combining software and hardware aspects that may all generally be referred to herein as a "system" (e.g., system 100 in FIG. 1 or computer system 102). Furthermore, an embodiment of the present invention may take the form of a computer program product embodied in any tangible medium of expression (e.g., memory 404 or computer data storage unit 412) having computer-usable program code (e.g., code for manifest extractor & parser 126 and JVM component 108) embodied or stored in the medium.

Any combination of one or more computer-usable or computer-readable medium(s) (e.g., memory 404 and/or computer data storage unit 412) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program for classloader structure generator 414, program for manifest extractor & parser 126 and/or the program for JVM component 108 is printed, as the programs 414, 126 and 108 can be electronically captured via, for instance, optical scanning of the paper or other medium, then compiled, interpreted, or otherwise processed in a suitable manner, if necessary, and then stored, respectively, in a computer memory 404. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code (e.g., program 414, program 126 and/or program 108) embodied therewith, either in baseband or as part of a carrier wave. The computer-usable program code may be transmitted using any appropriate medium, including but not limited to wireless, wireline, optical fiber cable, RF, etc.

Computer program code (e.g., code 414, code 126 and/or code 108) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. Any one of the aforementioned computers or servers may be computer system 102. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIG. 2 and FIG. 3) and/or block diagrams of methods, apparatus (systems) (e.g., FIG. 1 and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 414, code 126 and code 108). These computer program instructions may be provided to a processor (e.g., CPU 402) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 102) or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computer system 102) or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process for parsing an OSGi® bundle and controlling an operation of a JVM component on a per-classloader basis. Thus, an embodiment of the present invention discloses a process for supporting computer infrastructure, comprising integrating, hosting, maintaining and deploying computer-readable code (e.g., code 126 and code 108) into a computer system (e.g., computer system 102), wherein the code in combination with the computer system is capable of performing processes of parsing an OSGi® bundle and controlling an operation of a JVM component on a per-classloader basis.

In another embodiment, the invention provides a business method that performs the process steps of the invention on a subscription, advertising and/or fee basis. That is, a service provider, such as a Solution Integrator, can offer to create, maintain, support, etc. processes for parsing an OSGi® bundle and controlling an operation of a JVM component on a per-classloader basis. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2 and 3 and the block diagrams in FIGS. 1 and 4 illustrate the architecture, functionality, and operation of possible implementations of systems, methods, and computer program products according to various embodiments of the present invention. In this regard, each block in the flowchart or block diagrams may represent a module, segment, or portion of code (e.g., code 414, 126 or 108), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of controlling an operation of a component (JVM component) of a Java Virtual Machine (JVM) on a per-classloader basis, said method comprising:

a computer system loading an Open Services Gateway Initiative (OSGi) compliant bundle in an OSGi compliant computing framework;

said computer system generating a Java classloader uniquely associated with said OSGi compliant bundle;

said computer system extracting a manifest file from within said OSGi compliant bundle;

said computer system identifying metadata in said manifest file extracted from said OSGi compliant bundle;

responsive to said identifying said metadata, said computer system determining said metadata controls said operation of said JVM component, wherein said computer system includes said JVM component;

subsequent to said determining said metadata controls said operation of said JVM component, said computer system storing said metadata as a property in said Java classloader uniquely associated with said OSGi compliant bundle;

subsequent to said storing said metadata, said computer system identifying an upcoming performance of said operation of said JVM component;

responsive to said identifying said upcoming performance of said operation of said JVM component, said computer system reading a value of said stored metadata from said property in said Java classloader; and controlling, by a processor of said computer system, said operation of said JVM component based on said value of said metadata that is identified in said manifest file extracted from said OSGi compliant bundle and that is stored as said property in said Java classloader uniquely associated with said OSGi compliant bundle.

2. The method of claim 1, wherein said controlling said operation of said JVM component includes:

said JVM component determining a state of an object associated with said OSGi compliant bundle satisfies a predefined criterion based on said value of said metadata stored as said property in said Java classloader; and responsive to said determining said state of said object satisfies said predefined criterion, said JVM component managing said object by performing said operation.

3. The method of claim 1, further comprising:
said computer system loading a second OSGi compliant bundle in said OSGi compliant computing framework;
said computer system generating a second Java classloader uniquely associated with said second OSGi compliant bundle;
said computer system extracting a second manifest file from within said second OSGi compliant bundle;
said computer system identifying second metadata in said second manifest file extracted from said second OSGi compliant bundle, said second metadata being different from said metadata;
responsive to said identifying said second metadata, said computer system determining said second metadata controls said operation of said JVM component;
subsequent to said determining said second metadata controls said operation of said JVM component, said computer system storing said second metadata as a property in said second Java classloader uniquely associated with said second OSGi compliant bundle;
responsive to said identifying said upcoming performance of said operation of said JVM component, said computer system reading a value (second value) of said stored second metadata from said property in said second Java classloader; and
said computer system altering a behavior of said JVM component from said operation of said JVM component based on said value of said metadata to an operation of said JVM component based on said second value of said second metadata that is identified in said second manifest file extracted from said second OSGi compliant bundle and that is stored as said property in said second Java classloader uniquely associated with said second OSGi compliant bundle.

4. The method of claim 1, wherein said identifying said metadata includes obtaining a header including said metadata by parsing said manifest file.

5. The method of claim 4, wherein said storing said metadata includes storing said header as said property in said Java classloader.

6. The method of claim 4, further comprising said JVM component tracking a plurality of OSGi compliant bundles and a plurality of Java classloaders, wherein said Java classloaders are associated with said OSGi compliant bundles in a one-to-one correspondence, wherein said OSGi compliant bundle is included in said plurality of OSGi compliant bundles, wherein said Java classloader is included in said plurality of Java classloaders;
wherein said obtaining said header includes said JVM component extracting said header from said manifest file by executing an OSGi compliant method defined by said OSGi compliant computing framework.

7. The method of claim 6, wherein said executing said OSGi compliant method includes executing a getHeaders application programming interface (API) defined by said OSGi compliant computing framework.

8. The method of claim 1, wherein said JVM component is a garbage collector, wherein said operation of said JVM component is a garbage collection by said garbage collector, wherein said Java classloader is a classloader of a soft reference object, wherein said value of said metadata is a threshold number of garbage collections, and wherein said controlling said operation of said JVM component includes controlling said garbage collector by:

said computer system determining a number of times a soft reference object survived said garbage collection by said garbage collector;
said computer system obtaining said threshold number of garbage collections by querying said value of said metadata in said Java;
said computer system determining said number of times said software reference object survived said garbage collection is greater than or equal to said threshold number of garbage collections obtained by said querying said value of said metadata; and
based on said number of times said software reference object survived garbage collection is greater than or equal to said threshold number of garbage collections, said computer system collecting said soft reference object by performing said garbage collection.

9. A computer system comprising:
a processor and a computer-readable memory unit coupled to said processor, said memory unit containing instructions that when executed by said processor implement a method of controlling an operation of a component (JVM component) of a Java Virtual Machine (JVM) on a per-classloader basis, said method comprising:
said computer system loading an OSGi compliant bundle in an OSGi compliant computing framework;
said computer system generating a Java classloader uniquely associated with said OSGi compliant bundle;
said computer system extracting a manifest file from within said OSGi compliant bundle;
said computer system identifying metadata in said manifest file extracted from said OSGi compliant bundle;
responsive to said identifying said metadata, said computer system determining said metadata controls said operation of said JVM component, wherein said computer system includes said JVM component;
subsequent to said determining said metadata controls said operation of said JVM component, said computer system storing said metadata as a property in said Java classloader uniquely associated with said OSGi compliant bundle;
subsequent to said storing said metadata, identifying an upcoming performance of said operation of said JVM component;
responsive to said identifying said upcoming performance of said operation of said JVM component, reading a value of said stored metadata from said property in said Java classloader; and
controlling, by said processor, said operation of said JVM component based on said value of said metadata that is identified in said manifest file extracted from said OSGi compliant bundle and that is stored as said property in said Java classloader uniquely associated with said OSGi compliant bundle.

10. The system of claim 9, wherein said controlling said operation of said JVM component includes:
said JVM component determining a state of an object associated with said OSGi compliant bundle satisfies a predefined criterion based on said value of said metadata stored as said property in said Java classloader; and
responsive to said determining said state of said object satisfies said predefined criterion, said JVM component managing said object by performing said operation.

11. The system of claim 9, wherein said method further comprises:
said computer system loading a second OSGi compliant bundle in said OSGi compliant computing framework;

said computer system generating a second Java classloader uniquely associated with said second OSGi compliant bundle;

said computer system extracting a second manifest file from within said second OSGi compliant bundle;

said computer system identifying second metadata in said second manifest file extracted from said second OSGi compliant bundle, said second metadata being different from said metadata;

responsive to said identifying said second metadata, said computer system determining said second metadata controls said operation of said JVM component;

subsequent to said determining said second metadata controls said operation of said JVM component, said computer system storing said second metadata as a property in said second Java classloader uniquely associated with said second OSGi compliant bundle responsive to said identifying said upcoming performance of said operation of said JVM component, said computer system reading a value (second value) of said stored second metadata from said property in said second Java classloader; and said computer system altering a behavior of said JVM component from said operation of said JVM component based on said value of said metadata to an operation of said JVM component based on said second value of said second metadata that is identified in said second manifest file extracted from said second OSGi compliant bundle and that is stored as said property in said second Java classloader uniquely associated with said second OSGi compliant bundle.

12. The computer system of claim 9, wherein said JVM component is a garbage collector, wherein said operation of said JVM component is a garbage collection by said garbage collector, wherein said Java classloader is a classloader of a soft reference object, wherein said value of said metadata is a threshold number of garbage collections, and wherein said controlling said operation of said JVM component includes controlling said garbage collector by:

said computer system determining a number of times a soft reference object survived said garbage collection by said garbage collector;

said computer system obtaining said threshold number of garbage collections by querying said value of said metadata in said Java;

said computer system determining said number of times said software reference object survived said garbage collection is greater than or equal to said threshold number of garbage collections obtained by said querying said value of said metadata; and based on said number of times said software reference object survived garbage collection is greater than or equal to said threshold number of garbage collections, said computer system collecting said soft reference object by performing said garbage collection.

13. A computer program product, comprising:

a tangible, computer-readable storage device having a computer-readable program code stored therein, said computer-readable program code containing instructions configured to be executed by a processor of a computer system to implement a method of controlling an operation of a component (JVM component) of a Java Virtual Machine (JVM) on a per-classloader basis, said method comprising:

said computer system loading an OSGi compliant bundle in an OSGi compliant computing framework;

said computer system generating a Java classloader uniquely associated with said OSGi compliant bundle;

said computer system extracting a manifest file from within said OSGi compliant bundle;

said computer system identifying said metadata in said manifest file extracted from said OSGi compliant bundle;

responsive to said identifying said metadata, said computer system determining said metadata controls said operation of said JVM component, wherein said computer system includes said JVM component;

subsequent to said determining said metadata controls said operation of said JVM component, said computer system storing said metadata as a property in said Java classloader uniquely associated with said OSGi compliant bundle;

subsequent to said storing said metadata, identifying an upcoming performance of said operation of said JVM component;

responsive to said identifying said upcoming performance of said operation of said JVM component, reading a value of said stored metadata from said property in said Java classloader; and controlling, by said processor, said operation of said JVM component based on said value of said metadata that is identified in said manifest file extracted from said OSGi compliant bundle and that is stored in said property in said Java classloader uniquely associated with said OSGi compliant bundle.

14. The program product of claim 13, wherein said controlling said operation of said JVM component includes:

determining a state of an object associated with said OSGi compliant bundle satisfies a predefined criterion based on said value of said metadata stored as said property in said Java classloader; and responsive to said determining said state of said object satisfies said predefined criterion, managing said object by performing said operation.

15. The program product of claim 13, wherein said method further comprises:

said computer system loading a second OSGi compliant bundle in said OSGi compliant computing framework;

said computer system generating a second Java classloader uniquely associated with said second OSGi compliant bundle;

said computer system extracting a second manifest file from within said second OSGi compliant bundle;

said computer system identifying second metadata in said second manifest file extracted from said second OSGi compliant bundle, said second metadata being different from said metadata;

responsive to said identifying said second metadata, said computer system determining said second metadata controls said operation of said JVM component;

subsequent to said determining said second metadata controls said operation of said JVM component, storing said second metadata as a property in said second Java classloader uniquely associated with said second OSGi compliant bundle;

responsive to said identifying said upcoming performance of said operation of said JVM component, said computer system reading a value (second value) of said stored second metadata from said property in said second Java classloader; and said computer system altering a behavior of said JVM component from said operation of said JVM component based on said value of said metadata to an operation of said JVM component based on said second value of said second metadata that is identified in said second manifest file extracted from said second OSGi compliant bundle and that is stored as said property in said second Java classloader uniquely associated with said second OSGi compliant bundle.

16. The program product of claim 13, wherein said identifying said metadata includes obtaining a header including said metadata by parsing said manifest file.

17. The program product of claim 13, wherein said JVM component is a garbage collector, wherein said operation of said JVM component is a garbage collection by said garbage collector, wherein said Java classloader is a classloader of a soft reference object, wherein said value of said metadata is a threshold number of garbage collections, and wherein said controlling said operation of said JVM component includes controlling said garbage collector by:

said computer system determining a number of times a soft reference object survived said garbage collection by said garbage collector;

said computer system obtaining said threshold number of garbage collections by querying said value of said metadata in said Java;

said computer system determining said number of times said software reference object survived said garbage collection is greater than or equal to said threshold number of garbage collections obtained by said querying said value of said metadata; and based on said number of times said software reference object survived garbage collection is greater than or equal to said threshold number of garbage collections, said computer system collecting said soft reference object by performing said garbage collection.

* * * * *